(12) United States Patent
Childress

(10) Patent No.: US 10,982,439 B2
(45) Date of Patent: Apr. 20, 2021

(54) DRY FLOOR LIQUID DISPOSAL SYSTEM

(71) Applicant: THE BOEING COMPANY, Chicago, IL (US)

(72) Inventor: James Johnathan Childress, Mercer Island, WA (US)

(73) Assignee: THE BOEING COMPANY, Chicago, IL (US)

( * ) Notice: Subject to any disclaimer, the term of this patent is extended or adjusted under 35 U.S.C. 154(b) by 22 days.

(21) Appl. No.: 16/175,337

(22) Filed: Oct. 30, 2018

(65) Prior Publication Data
US 2020/0018065 A1 Jan. 16, 2020

Related U.S. Application Data

(60) Provisional application No. 62/697,727, filed on Jul. 13, 2018.

(51) Int. Cl.
E04B 5/48 (2006.01)
B32B 5/02 (2006.01)
(Continued)

(52) U.S. Cl.
CPC .............. E04B 5/48 (2013.01); B32B 5/02 (2013.01); B32B 17/06 (2013.01); E04F 15/18 (2013.01);
(Continued)

(58) Field of Classification Search
CPC ....... A47L 23/22; B64C 1/18; B64C 2211/00; E04F 15/00; E04F 15/18; E04F 15/02172;
(Continued)

(56) References Cited

U.S. PATENT DOCUMENTS 456,085 A * 7/1891 Curtis ..................... A47L 23/22
15/112
543,999 A * 8/1895 Morton ................... A47L 23/22
15/112
(Continued)

FOREIGN PATENT DOCUMENTS

CN 107232944 A 10/2017
EP 1808546 A1 7/2007
(Continued)

OTHER PUBLICATIONS

Extended European Sear Report dated Oct. 2, 2019 for corresponding EP Application No. 19170026.9-1010.

Primary Examiner — Basil S Katcheves
Assistant Examiner — Omar F Hijaz
(74) Attorney, Agent, or Firm — The Small Patent Law Group LLC; Joseph M. Butscher

(57) ABSTRACT

A dry floor assembly is provided. The dry floor assembly is configured to form or be positioned on a floor of an enclosed space. The dry floor assembly includes a grid, a pan, and a wicking layer. The grid has an array of openings configured to allow passage of liquid. The grid has members that extend from a base to an upper surface, with the upper surface configured to be walked upon. The members have a cross-section that tapers from the base to the upper surface. The pan is disposed beneath the grid, and defines a cavity. The wicking layer is interposed between the pan and the grid, and is configured to wick liquid that passes through the openings toward the pan.

21 Claims, 7 Drawing Sheets

(51) Int. Cl.
  *B32B 17/06* (2006.01)
  *E04F 15/18* (2006.01)
  *B64C 1/18* (2006.01)
(52) U.S. Cl.
  CPC ........... *B32B 2307/726* (2013.01); *B64C 1/18* (2013.01); *B64C 2211/00* (2013.01)
(58) Field of Classification Search
  CPC .. E04B 5/48; B32B 2307/726; A47G 27/0225
  See application file for complete search history.

(56) References Cited

U.S. PATENT DOCUMENTS

| | | | |
|---|---|---|---|
| 3,605,166 A * | 9/1971 | Chen | A47L 23/24 |
| | | | 15/215 |
| 3,995,328 A | 12/1976 | Carolan et al. | |
| 4,063,315 A | 12/1977 | Carolan et al. | |
| 4,420,180 A * | 12/1983 | Dupont | B60N 3/044 |
| | | | 15/215 |
| 4,533,352 A | 8/1985 | Van Beek et al. | |
| 4,819,276 A | 4/1989 | Stevens | |
| 5,020,638 A * | 6/1991 | Smith | F16N 31/006 |
| | | | 184/1.5 |
| 5,176,667 A | 1/1993 | Debring | |
| 5,199,457 A * | 4/1993 | Miller | E03C 1/186 |
| | | | 137/312 |
| 5,349,965 A | 9/1994 | McCarver | |
| 5,827,246 A | 10/1998 | Bowen | |
| 6,102,073 A * | 8/2000 | Williams | A61M 1/008 |
| | | | 137/312 |
| 6,290,685 B1 | 9/2001 | Insley et al. | |
| 6,470,512 B1 | 10/2002 | Lau et al. | |
| 7,051,748 B2 | 5/2006 | Vanbasten | |
| 7,131,965 B1 | 11/2006 | Thornbury et al. | |
| 7,316,834 B2 * | 1/2008 | Hernandez | E04H 6/428 |
| | | | 180/69.1 |
| 7,363,936 B1 * | 4/2008 | Simoneaux | B65D 25/06 |
| | | | 137/312 |
| 8,372,506 B2 * | 2/2013 | Vainshtein | A47B 97/00 |
| | | | 428/167 |
| 8,839,812 B2 * | 9/2014 | Tanhehco | A61G 13/102 |
| | | | 137/312 |
| 9,623,133 B2 | 4/2017 | Childress et al. | |
| 10,065,740 B2 | 9/2018 | Childress et al. | |
| 10,520,241 B1 * | 12/2019 | Nelson | F25D 21/14 |
| 2002/0092110 A1 * | 7/2002 | Blum | G09F 19/228 |
| | | | 15/215 |
| 2003/0177572 A1 | 9/2003 | Guerin et al. | |
| 2003/0211291 A1 | 11/2003 | Castiglione et al. | |
| 2004/0019993 A1 * | 2/2004 | Blum | A47L 23/22 |
| | | | 15/215 |
| 2006/0041238 A1 * | 2/2006 | Bowen | A61G 13/102 |
| | | | 604/378 |
| 2009/0241442 A1 * | 10/2009 | MacLean | E03F 3/046 |
| | | | 52/220.3 |
| 2013/0099055 A1 | 4/2013 | Pfeiffer | |
| 2014/0115764 A1 | 5/2014 | Cheng et al. | |
| 2014/0230185 A1 * | 8/2014 | Burea | A47L 23/263 |
| | | | 15/415.1 |
| 2015/0061380 A1 * | 3/2015 | Schomacker | B64C 1/18 |
| | | | 307/9.1 |
| 2015/0298440 A1 * | 10/2015 | Crotty | B32B 5/022 |
| | | | 442/397 |
| 2015/0322656 A1 | 11/2015 | Huang et al. | |
| 2017/0283062 A1 | 10/2017 | Childress | |
| 2018/0015862 A1 * | 1/2018 | Chavez Martinez | B60N 3/048 |

FOREIGN PATENT DOCUMENTS

| | | |
|---|---|---|
| EP | 3225549 A1 | 10/2017 |
| WO | 2005012085 A1 | 2/2005 |
| WO | 2014036217 A2 | 3/2014 |
| WO | 2018077118 A1 | 5/2018 |

* cited by examiner

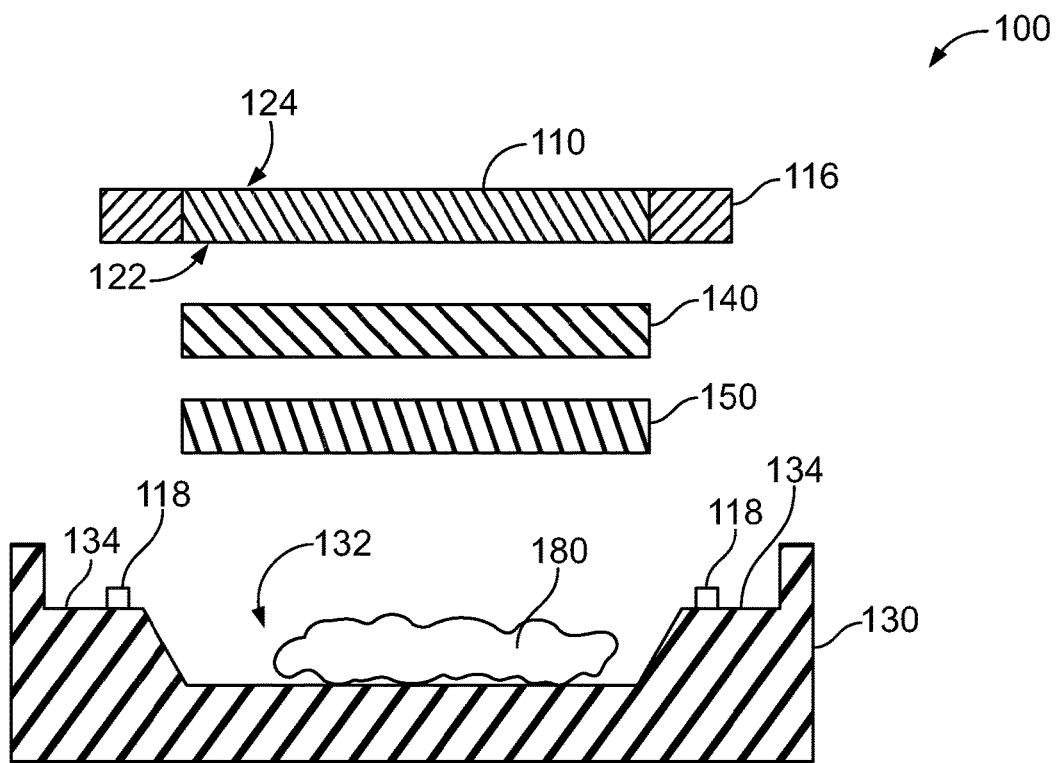
FIG. 3
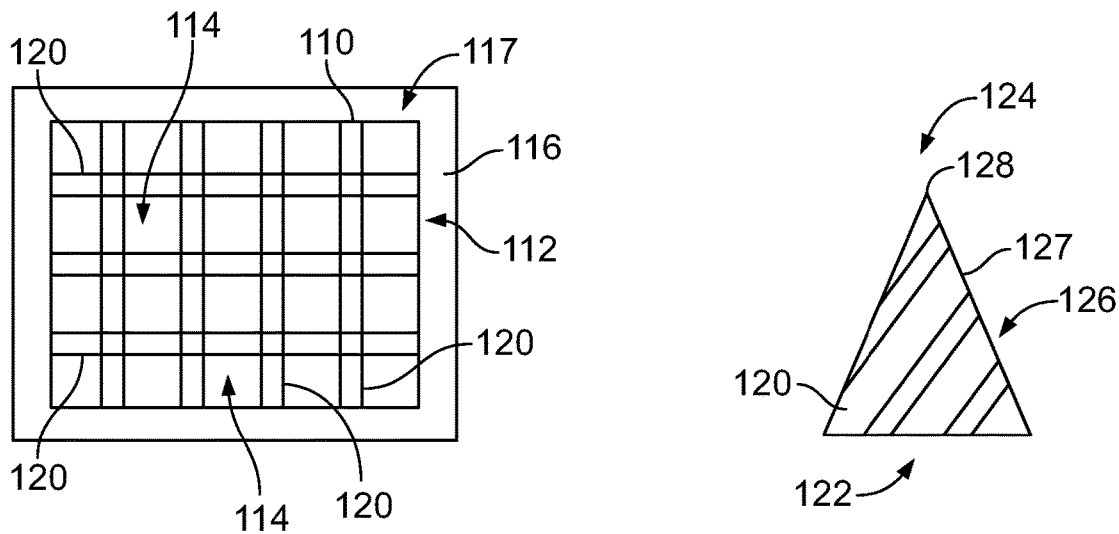
FIG. 4
FIG. 5

DRY FLOOR LIQUID DISPOSAL SYSTEM

RELATED APPLICATIONS

This application relates to and claims priority benefits from U.S. Provisional Patent Application No. 62/697,727, entitled "Dry Floor Liquid Disposal System," filed Jul. 13, 2018, which is hereby incorporated by reference in its entirety.

FIELD OF THE DISCLOSURE

Embodiments of the present disclosure generally relate to systems and methods for providing a floor for collection and/or removal of liquid, such as a lavatory floor within a commercial aircraft.

BACKGROUND OF THE DISCLOSURE

In various environments, floors may be subject to spillage or leakage of liquids. It may not be possible or practical to manually remove the liquid from the floor in as short a time as may be desired. For example, commercial aircraft are used to transport passengers between various locations. During a flight—particularly a trans-oceanic or other long haul flight—passengers are typically confined within certain areas (for example, cabins) of an aircraft. Various individuals (such as passengers, pilots, flight attendants, and the like) use certain internal portions of an aircraft during a flight. For example, numerous individuals may use a lavatory within an internal cabin during a flight. Liquid (e.g., from the sink) may be spilled to the lavatory floor.

An aircraft lavatory is generally cleaned between flights. For example, maintenance or cleaning personnel board the aircraft on the ground before and/or after a flight to clean the lavatory. However, during a flight, the lavatory is typically not cleaned, despite the fact that numerous individuals may use the lavatory during the flight. While flight attendants may be able to clean the lavatory, they are usually preoccupied with other duties during the flight. As such, cleaning the lavatory may not be a top priority for flight attendants during a flight or even between flights. Consequently, the dryness of lavatory floors onboard an aircraft may be compromised, particularly during flights. As such, a flight experience for individuals onboard the aircraft may be negatively impacted.

SUMMARY OF THE DISCLOSURE

A need exists for a system and a method for providing a dry floor assembly. A need exists for a system and method for providing dry floors (e.g., for a lavatory after use). A need exists for a system and a method for effectively and efficiently providing a dry lavatory floor onboard an aircraft, particularly during a flight.

With those needs in mind, certain embodiments of the present disclosure provide a dry floor assembly. The dry floor assembly is configured to form or be positioned on a floor of an enclosed space. The dry floor assembly includes a grid, a pan, and a wicking layer. The grid has an array of openings configured to allow passage of liquid. The grid has members that extend from a base to an upper surface, with the upper surface configured to be walked upon. The members have a cross-section that tapers from the base to the upper surface. The pan is disposed beneath the grid, and defines a cavity. The wicking layer is interposed between the pan and the grid, and is configured to wick liquid that passes through the openings toward the pan.

Certain embodiments of the present disclosure provide a method for providing a dry floor assembly that is configured to form or be positioned on a floor of an enclosed space. The method includes providing a grid having an array of openings configured to allow passage of liquid. The grid has members extending from a base to an upper surface, with the upper surface configured to be walked upon. The members have a cross-section that tapers from the base to the upper surface. The method also includes disposing a pan beneath the grid. The pan defines a cavity. Further, the method includes providing a wicking layer interposed between the pan and the grid. The wicking layer is configured to wick liquid that passes through the openings of the grid toward the pan.

Certain embodiments of the present disclosure provide an absorbent pad (e.g., for use with a dry floor assembly). The absorbent pad includes an absorbent core portion, a wicking portion, and a fiberglass outer play. The wicking portion surrounds the absorbent core. The fiberglass outer ply surrounds the wicking portion and defines an exterior of the absorbent pad.

BRIEF DESCRIPTION OF THE DRAWINGS

FIG. 3 illustrates an exploded side sectional view of a dry floor assembly, according to an embodiment of the present disclosure.

FIG. 4 provides a plan view of s grid 110 of the dry floor assembly of FIG. 3.

FIG. 5 provides a cross-section of a member of the grid of FIG. 4.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Embodiments of the present disclosure provide systems, methods, and assemblies for providing a dry floor, such as a lavatory floor. The systems, methods, and assemblies may be used in various settings, such as within a lavatory of a vehicle, a public washroom in a building, a laboratory, and/or the like. Examples of vehicles for various embodiments include aircraft, ships, or ground-based vehicles such as buses or trains.

Various embodiments of the present disclosure provide a dry floor assembly for removing liquids from a floor or walking surface. Various embodiments provide a multilayer system to reduce or eliminate liquid pooling, with the top layer staying dry to the touch, and a lower layer pulling liquid from the top layer.

Various embodiments provide for the removal of liquids from a floor. Further, various embodiments provide easily replaceable components that are seamlessly interfaced to existing infrastructure (e.g., aircraft infrastructure).

Figure 1:
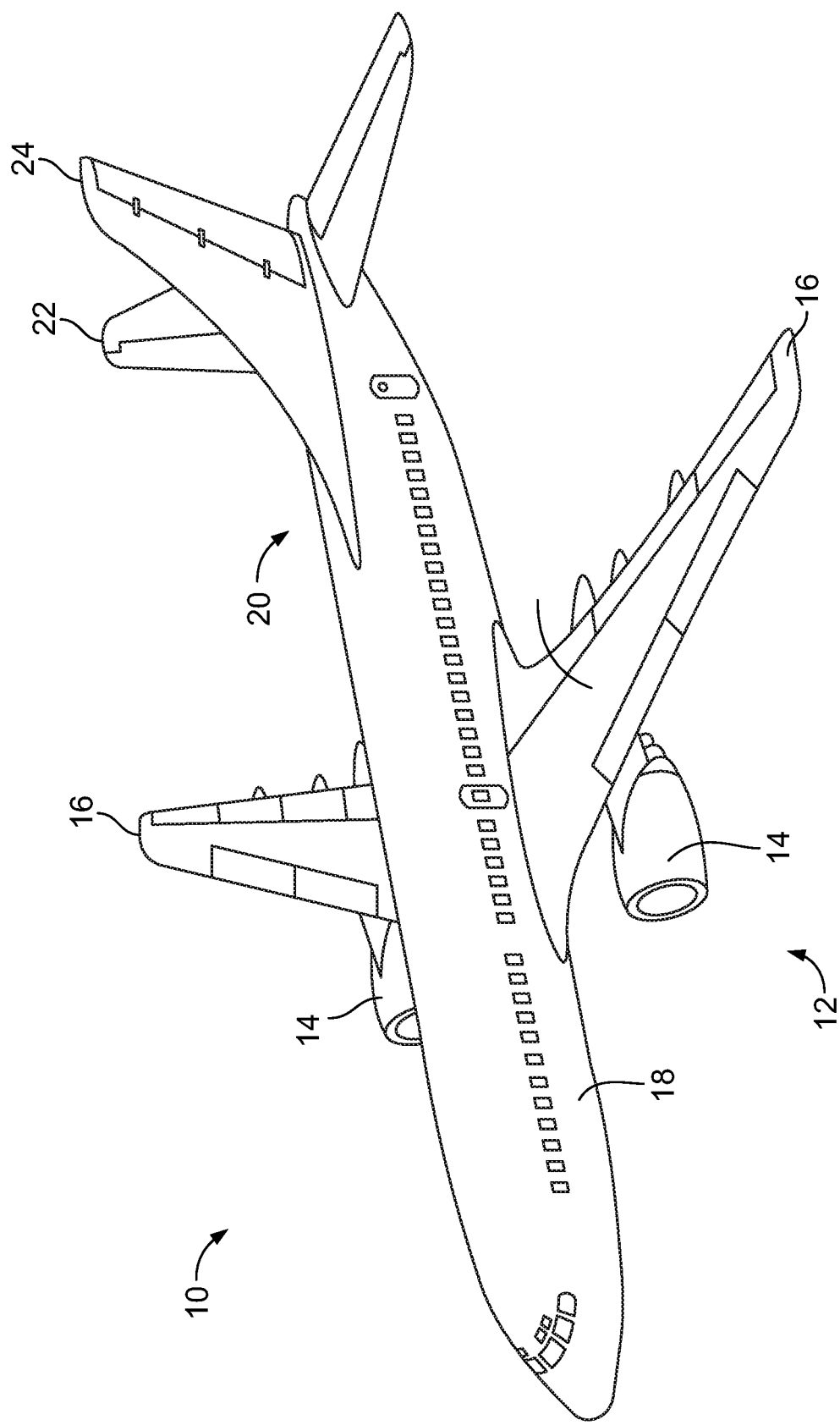
FIG. 1 illustrates a perspective top view of an aircraft, according to an embodiment of the present disclosure.

FIG. 1 illustrates a perspective top view of an aircraft 10, according to an embodiment of the present disclosure. The aircraft 10 may include a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24. While various embodiments are discussed in connection with aircraft, it may be again noted that other embodiments may be utilized in connection with, for example, other vehicle, such as ships, or ground-based vehicles such as buses or trains.

The fuselage 18 of the aircraft 10 defines an internal cabin, which may include a cockpit, one or more work sections (for example, galleys, personnel carry-on baggage areas, and the like), one or more passenger sections (for example, first class, business class, and coach sections), and an aft section in which an aft rest area assembly may be positioned. Each of the sections may be separated by a cabin transition area, which may include one or more class divider assemblies. Overhead stowage bin assemblies may be positioned throughout the internal cabin.

The internal cabin includes one or more lavatories, for example. Embodiments of the present disclosure provide systems and methods that are configured to automatically dry floors within the lavatories.

Alternatively, instead of an aircraft, embodiments of the present disclosure may be used with various other vehicles, such as automobiles, buses, locomotives and train cars, watercraft, spacecraft, and the like. Further, embodiments of the present disclosure may be used with respect to fixed structures, such as commercial and residential buildings. As an example, embodiments of the present disclosure may be used to automatically dry floors of lavatories, whether or not the lavatories are within vehicles.

Figure 2A:
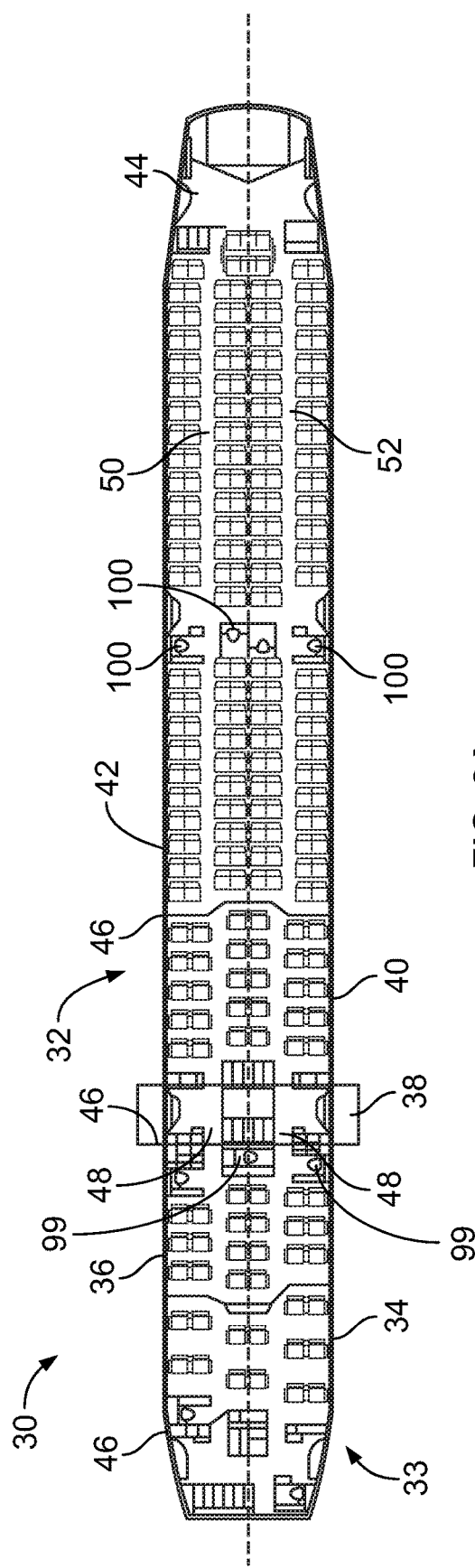
FIG. 2A illustrates a top plan view of an internal cabin of an aircraft, according to an embodiment of the present disclosure.

FIG. 2A illustrates a top plan view of an internal cabin 30 of an aircraft, according to an embodiment of the present disclosure. The internal cabin 30 may be within a fuselage 32 of the aircraft. For example, one or more fuselage walls may define the internal cabin 30. The internal cabin 30 includes multiple sections, including a front section 33, a first class section 34 (or first class suites, cabins, for example), a business class section 36, a front galley station 38, an expanded economy or coach section 40, a standard economy or coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46, which may include class divider assemblies between aisles 48.

As shown in FIG. 2A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

One or more lavatories 99 may be located within the internal cabin 30. The lavatories 99 may include dry floor assemblies as discussed herein, which may be secured within a portion of the fuselage. The dry floor assemblies are configured to reduce or eliminate an amount of visible liquid on an exposed top surface.

Figure 2B:
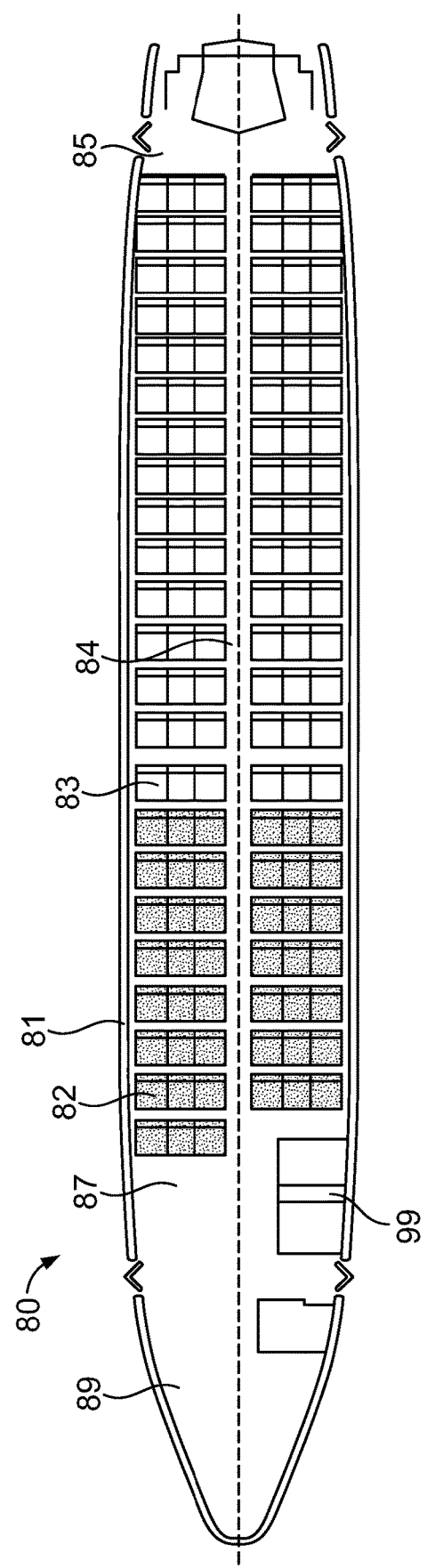
FIG. 2B illustrates a top plan view of an internal cabin of an aircraft, according to an embodiment of the present disclosure.

FIG. 2B illustrates a top plan view of an internal cabin 80 of an aircraft, according to an embodiment of the present disclosure. The internal cabin 80 may be within a fuselage 81 of the aircraft. For example, one or more fuselage walls may define the internal cabin 80. The internal cabin 80 includes multiple sections, including a main cabin 82 having passenger seats 83, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

A dry floor assembly may be located within a lavatory 99 of the main cabin 82 at a fore section 87 proximate to a cockpit area 89. Additional lavatories 99 may be located throughout the main cabin 82.

FIG. 3 illustrates an exploded side sectional view of a dry floor assembly 100. As seen in FIG. 3, the dry floor assembly 100 of the illustrated example includes a grid 110, a pan 130, a wicking layer 140, a support layer 150, and an absorbent pad 180. The dry floor assembly 100 is configured to form a portion of a floor in an enclosed space (e.g., aircraft lavatory, ship lavatory, or lavatory of ground-based vehicles such as buses or trains), or to be positioned on or in a floor of an enclosed space. Generally, the grid 110 provides a surface to be walked upon, and has openings through which liquid spilled on the walking surface passes. The wicking layer 140 helps direct the liquid that has passed through the grid 110 toward the pan 130. The pan 130 is used to collect, store, and/or direct the liquid for disposal. For example, in the embodiment depicted in FIG. 3, the absorbent pad 180 is disposed beneath the wicking layer 140 (e.g., within the pan 130) and used to absorb liquid passing through the grid 110. The absorbent pad 180, for example, may be replaced after it has absorbed a predetermined amount of liquid and/or at a predetermined time interval. In other embodiments, liquid may be stored in the pan 130 and later removed (e.g., by vacuuming the pan 130). As another alternative, as discussed herein, the pan 130 may be used to direct liquid to a separate reservoir. The separate reservoir may then collect the liquid for later removal, or alternatively an absorbent pad may be disposed in the separate reservoir. Accordingly, the water is directed away from the walking surface and toward a storage and collection area for subsequent removal, providing a clean, safe walking surface. It may be noted that various embodiments herein are discussed in connection with use in commercial aircraft (e.g., in an aircraft lavatory). However, it may be noted that alternative embodiments may be used in other applications.

FIG. 4 provides a plan view of the grid 110, and FIG. 5 provides a cross-section of a member of the grid 110. As seen in FIG. 4, the grid 110 has an array 112 of openings 114 configured to allow passage of liquid. With reference to FIGS. 3, 4, and 5, the grid 110 has members 120 that extend from a base 122 to an upper surface 124. As best seen in the example cross-section of FIG. 5, the members 120 have a cross-section 126 that tapers from the base 122 to the upper surface 124. The tapering provides a sloped surface that helps direct water away from the upper surface 124 and toward the base 122 (and pan 130). It may further be noted that in various embodiments the members 120 maintain the tapered shape at intersection points of the members 120, helping to prevent beading or other accumulation of liquid at the intersection points of the members 120. The grid may be easily removable and replaced as necessary (e.g., due to wear).

Generally, the members 120 cross each other to define the openings 114. In various embodiments, the openings 114 are sized to be smaller than a stiletto heel base to provide a safe, convenient walking surface while still allowing for drainage from the upper surface 124. It may be noted that the members 120 of the illustrated embodiments are substantially identical to each other dimensionally and in cross-section, however differently shaped members may be used in various embodiments. It may further be noted that the grid 110 of the illustrated example provides a uniformly spaced rectangular grid; however, other shapes or spacings may be used in other embodiments.

As also seen in FIGS. 3 and 4, the depicted example includes a strip 116 that extends around a perimeter 117 of the grid 110. The strip 116 is bonded to the grid 110. Additionally or alternatively, the strip 116 is bonded to the wicking layer 140 and/or the support layer 150. The strip 116 provides support to the grid 110 and may be used for mounting and/or positioning the grid 110. For example, as seen in FIG. 3, the depicted pan 130 includes a ledge 134. In some embodiments, the strip 116 is made of a metallic material (e.g., steel), and may be secured to the ledge 134 (e.g., held in place on the ledge 134) via magnets 118.

Figure 9:
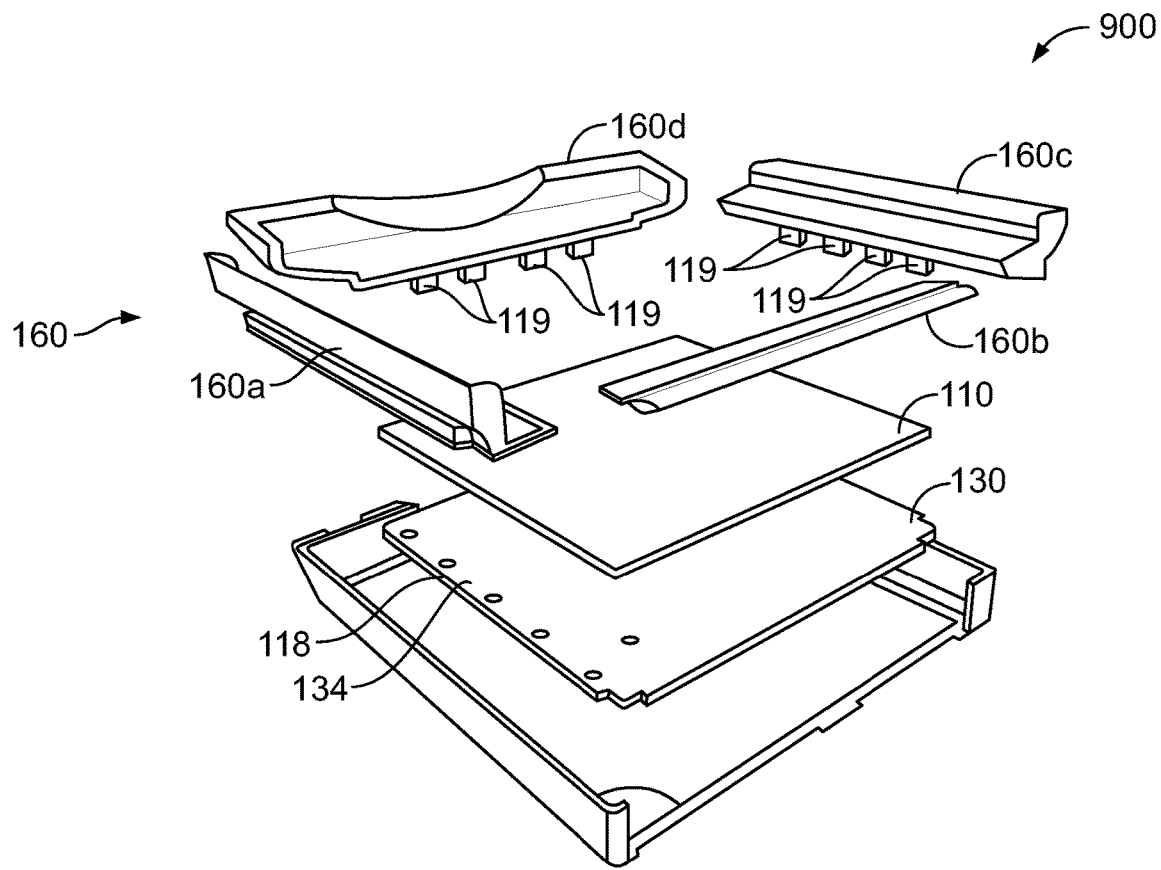
FIG. 9 illustrates an exploded perspective view of a system that includes surround members, according to an embodiment of the present disclosure.

In various embodiments, the strip 116 and/or ledge 134 and associated magnets may also be used to mount additional structures (e.g., on top of the dry floor assembly 100. For example, in various embodiments, at least one surround member 160 may be secured to the strip 116 via magnets. FIG. 9 illustrates an exploded perspective view of a system 900 that includes the dry floor assembly 100 (e.g., pan 130 and grid 110). It may be noted that the support layer 150 and wicking layer 140 are not shown in FIG. 9; however, one or both may be utilized in various embodiments in connection with the aspects discussed in connection with FIG. 9. As seen in FIG. 9, the pan 130 and grid 110 are configured to be placed in a floor pan 910 (e.g., a floor pan of a commercial aircraft). Various surround members 160 are utilized, including an assist wall edging 160a, a threshold edge 160b, a sing wall edging 160c, and a toilet edging 160d. Each surround member 160 includes one or more magnets 119 that are used to secure the corresponding surround member 160 to the strip 116 via magnetic attraction between the magnets 119 and the strip 116 and/or the magnets 119 of the surround member 160 and the magnets 118 of the ledge 134 of the pan 130 (e.g., the magnets 119 and magnets 118 may be aligned with each other and positioned with respective north and south poles oriented toward each other). In various embodiments, the surround members may be used to allow use of a standardized grid size, with the surround members accommodating variations from the grid size in different environments (e.g., differently sized lavatories).

In various embodiments, the grid 110 is formed of a non-flammable material. As used herein, a non-flammable material is a material that satisfies commercial aircraft non-flammability standards or regulations. The grid 110 may be cast using a thermoset resin. As one example, 892 urethane may be used for forming the grid 110. Further, the grid 110 in various embodiments has a hydrophobic coating, helping to urge water away from the grid 110 and toward the wicking layer 140 and pan 130.

As best seen in FIG. 5, in the illustrated embodiment the cross-section 126 of the members 120 of the grid 110 defines an isosceles triangle 127 that tapers to a point 128 at the upper surface 124. It may be noted that other shapes may be employed in other embodiments. For example, while the illustrated example is symmetrical about a vertical axis passing through the point 128, other embodiments may be asymmetrical about a vertical axis passing through the point 128. For instance, in some embodiments, the point 128 may be at a lateral edge of the cross-section 126 instead of being centrally located as in the illustrated embodiment. It may further be noted that in the illustrated example, all members 120 have the same cross-section 126; however, in other embodiments at least some members 120 may utilize different cross-sections from others.

With continued reference to FIG. 3, the wicking layer 140 is disposed beneath the grid 110 and interposed between the grid 110 and the pan 130. It may be noted that, in the illustrated embodiment, the support layer 150 is interposed directly between the wicking layer 140 and the pan 130. Generally, the wicking layer 140 is configured to wick liquid that passes through the openings 114 of the grid 110 toward the pan 130. In various embodiments (e.g., for use in commercial aircraft) the wicking layer 140 may be made of one or more non-flammable materials. In some embodiments, a graphite veil (or felt) may be used in the wicking layer. Additionally or alternatively, fiberglass may be used in the wicking layer.

Figure 6:
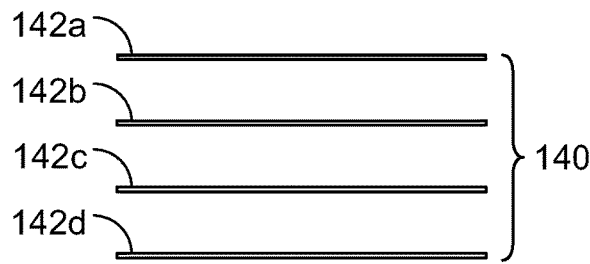
FIG. 6 provides an exploded side view of an example wicking layer, according to an embodiment of the present disclosure.
Figure 7:
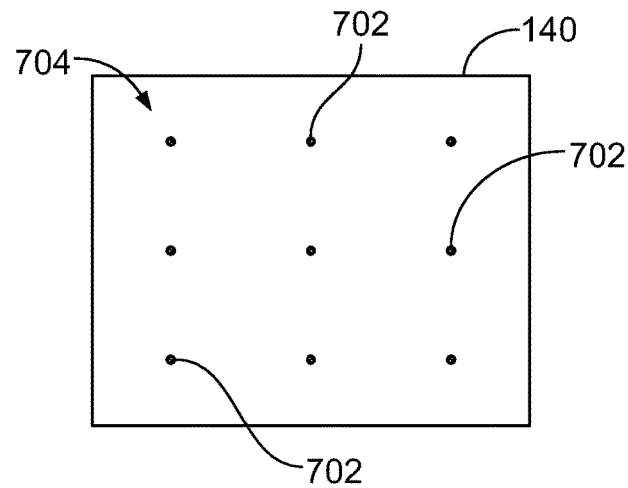
FIG. 7 provides a plan view of the example wicking layer of FIG. 6.

It may be noted that in various embodiments, the wicking layer 140 may include two or more sub-layers. FIG. 6 provides an exploded side view of an example wicking layer 140 with plural sublayers, and FIG. 7 provides a plan view of the example wicking layer 140. As seen in FIG. 6, the depicted wicking layer includes 4 sublayers 142a, 142b, 142c, 142d. In various embodiments, the use of multiple relatively thin wicking layers provides improved wicking from the grid 110 to the pan 130. In some embodiments, the wicking sub-layers may be made of the same material, while in other embodiments the wicking sub-layers may be made of different materials from each other to provide a desired color and/or desired wicking performance. For example, in the illustrated embodiment, the sublayers 142a, 142b may be made of a graphite veil while the sublayers 142c, 142d may be made of fiberglass.

The wicking sub-layers in the illustrated embodiment are bonded (e.g., using adhesive) at discrete points to at least one of an adjacent sub-layer or the grid 110. For example, the uppermost sub-layer is bonded on one side to the base 122 of the grid 110, and on the other side to the second uppermost sub-layer. As another example, the lower most sub-layer is bonded on its lowermost side to the support layer 150, and on the other side to the second lower most sub-layer. As seen in FIG. 7, the bonding is provided at discrete points 702. The points 702 may be arranged in an array 704 configured to align the points 702 with solid portions (e.g., the members 120 or intersection points of the members 120) of the grid 110 and solid portions of the support layer 150. A tool or template may be used to apply adhesive at the points 702 to help insure accurate placement. Use of intermittent bonding points in various embodiments helps the wicking sublayers to maintain uniform or near-uniform contact to help spread wicking ability for localized spills.

Figure 8:
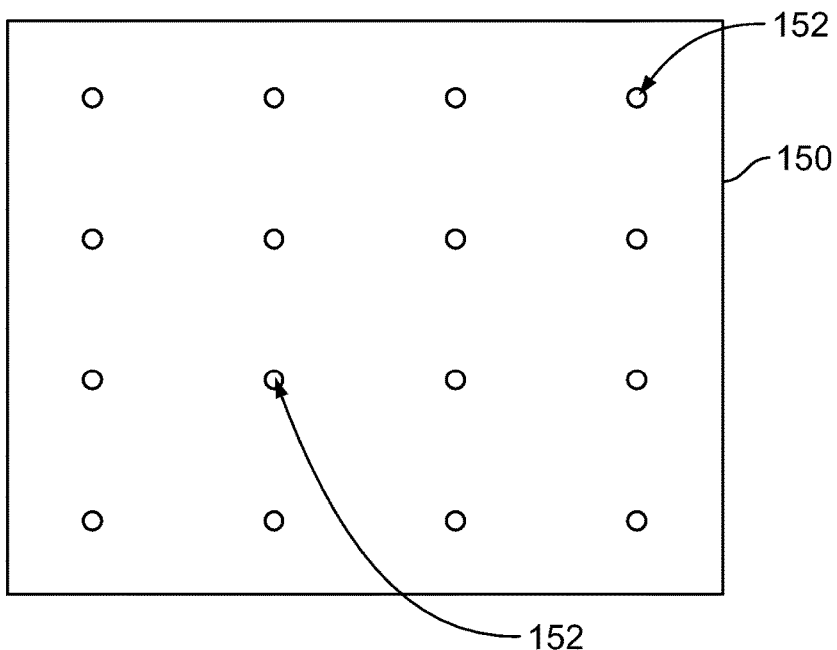
FIG. 8 provides a plan view of a support layer of the assembly of FIG. 3.

With continued reference to FIG. 3, the support layer 150 of the illustrated embodiment is disposed beneath the wicking layer 140, and between the wicking layer 140 and the pan 130. The support layer 150 helps provide support or rigidity to the wicking layer 140 and grid 110 to help support loads exerted on the upper surface 124 of the grid 110. The support layer 150 in various embodiments may be made of a metallic material. FIG. 8 provides a plan view of the support layer 150. As seen in FIG. 8, the support layer 150 includes support openings 152 that are smaller than the openings 114 of the array 112 of the grid 110. Accordingly, with the openings 152 of the support layer 150 aligned with the openings 114 of the grid 110, the support layer 152 has solid portions immediately beneath the members 120 to provide support to forces applied to the members 120 (e.g., by a person walking and/or standing on the upper surface 124 of the grid 110.

Returning to FIG. 3, the depicted pan 130 is disposed beneath the grid 110 and defines a cavity 132. The cavity 132 is configured to collect and/or redirect liquid that passes through the grid 110. For example, in the illustrated embodiment, the absorbent pad 180 is disposed within the cavity 132. Liquid passing through the grid 110 and wicking layer 140 is absorbed by the absorbent pad 180 for subsequent removal. In other embodiments, no absorbent pad 180 may be used, and liquid may be allowed to accumulate in the pan 130. Then, at a later, convenient time (e.g., between flights and/or during a scheduled maintenance period) the liquid may be removed from the pan 130 (e.g., via vacuuming). It may be noted that the pan 130 may be separate from the flooring with which it is associated (e.g., configured as a plug-in replacement that may be retrofitted to an existing location), or, in other embodiments, may be an integral part of a room's floor system.

Figure 10:
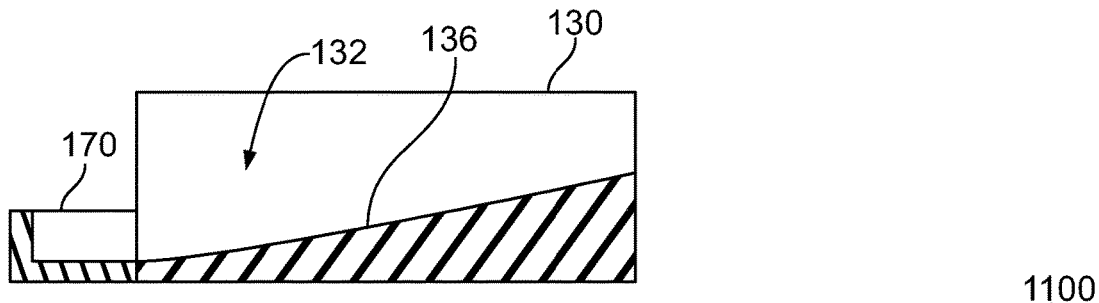
FIG. 10 provides a side view of a pan with a reservoir, according to an embodiment of the present disclosure.

In some embodiments, the pan 130 may be used to redirect liquid to an additional or supplemental reservoir. For example, FIG. 10 illustrates a side sectional view of a pan 130 formed in accordance with various embodiments. As seen in FIG. 10, the depicted example dry floor assembly 100 includes a reservoir 170 that is in fluid communication with the pan 130. The pan 130 includes a sloped floor 136 that is configured to direct fluid to a reservoir 170. The reservoir 170, for example, may be disposed off to a side of the pan 130, and may provide a more convenient location for removing liquid from the dry floor assembly 100. It may be noted that a single sloped surface is shown in FIG. 10 for ease and clarity of illustration. However, in various embodiments, multiple sloped sections and/or gutters or other pathways may be used to direct liquid to the reservoir 170. The reservoir 170 may be used to collect and store liquid, or, additionally or alternatively, may be used to hold an absorbent pad for the collection of liquid.

Figure 11:
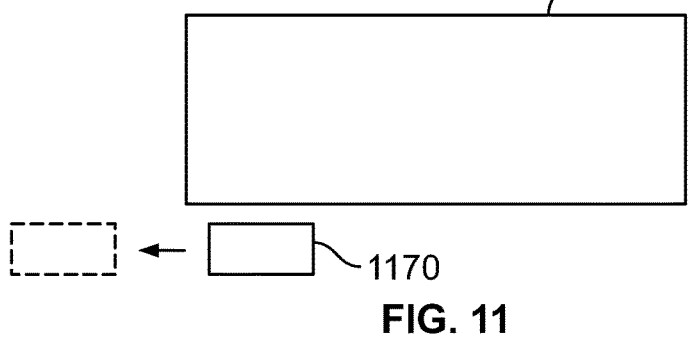
FIG. 11 provides a side view of a pan with an articulable reservoir, according to an embodiment of the present disclosure.

Further, in some embodiments, the reservoir 170 may be slidable or otherwise movable with respect to the pan 130. For example, FIG. 11 provides a side view of a pan 1100 with an articulable reservoir 1170. As seen in FIG. 11, the reservoir 1170 is articulable (e.g., slidable) between a collection position (shown in solid lines) and a liquid removal position (shown in phantom lines). The liquid removal position provides a convenient location for removing accumulated liquid and/or an absorbent pad from the reservoir 1170.

Figure 12:
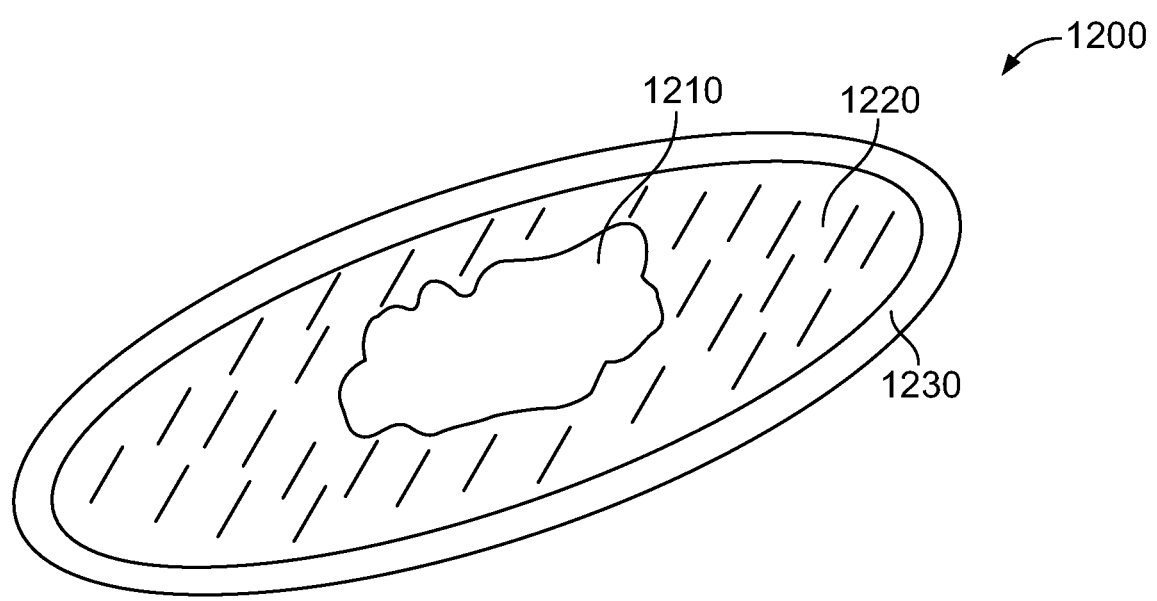
FIG. 12 provides a schematic view of an absorbent pad, according to an embodiment of the present disclosure.

As discussed herein, various embodiments may be used in connection with commercial aircraft, for which stringent anti-flammability standards or regulations may be in effect. Various embodiments provide absorbent pads that help reduce or eliminate any risk of fire. For example, FIG. 12 provides a schematic view of an absorbent pad 1200. The depicted absorbent pad 1200 includes an absorbent core portion 1210, a wicking portion 1220, and a fiberglass outer ply 1230. The absorbent core portion 1210 is configured to absorb liquid, and may be made of, for example, sodium phosphate. The wicking portion 1220 surrounds the absorbent core 1210, and is configured to wick liquid toward the absorbent core 1210. The fiberglass outer ply 1230 surrounds the wicking portion and defines an exterior 1232 of the absorbent pad 1200. The fiberglass outer play 1230 is made of a non-flammable fiberglass to help reduce or eliminate any risk of fire and to help satisfy any applicable safety standards. In some embodiments, the wicking portion 1220 may be made of cellulose. Even though cellulose may be flammable, the cellulose may burn at a low enough temperature so that the fiberglass outer play 1230 may contain or reduce any flame resulting from the cellulose. In other embodiments, to provide further safety, the wicking portion 1220 may be made of a non-flammable material. For example, in some embodiments, the wicking portion 1220 is made of a fiberglass material, such as fiberglass batting insulation.

Figure 13:
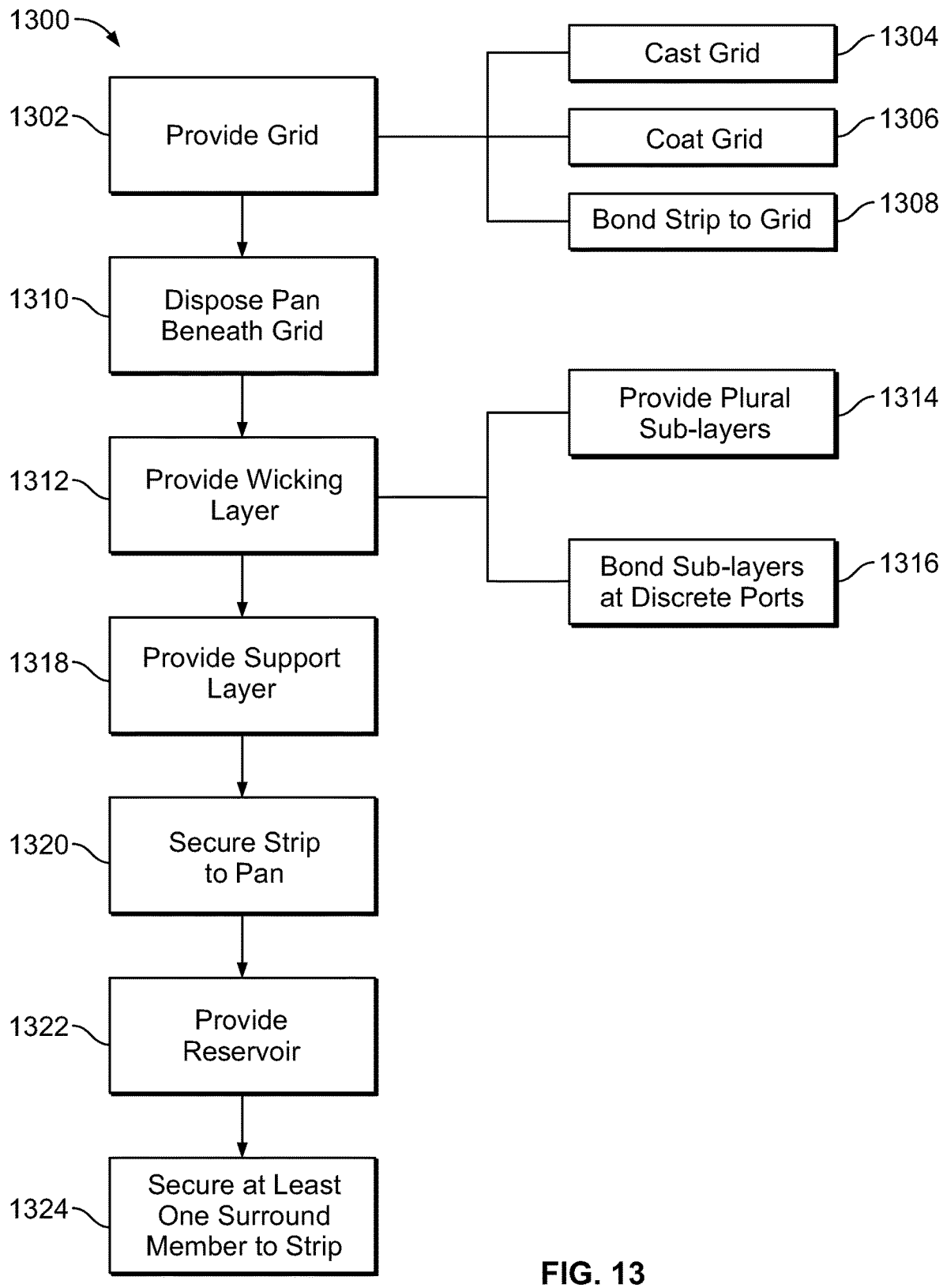
FIG. 13 illustrates a flow chart of a method for providing a dry floor assembly, according to an embodiment of the present disclosure.

FIG. 13 illustrates a flowchart of a method 1300 for providing a dry floor assembly (e.g., assembly 100) that is configured to form or be positioned on a floor of an enclosed space (e.g., aircraft lavatory). The method 1300, for example, may employ structures or aspects of various embodiments (e.g., systems and/or methods) discussed herein. In various embodiments, certain steps (or operations) may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

At 1302, a grid (e.g., grid 110 is provided). Generally, the grid is configured to provide a support surface for walking or standing, and also to provide openings for the drainage or removal of liquid from the walking surface. In various embodiments, the grid has an array of openings configured to allow passage of liquid, and includes members extending from a base to an upper surface configured to be walked upon, with the members having a cross-section that tapers from the base to the upper surface.

In some embodiments, the grid may be cast or molded. For example, in the illustrated embodiment, at 1304, the grid is cast using a non-flammable material. At 1306, the grid is coated with a hydrophobic coating. Further, in the illustrated embodiment, a strip (e.g., strip 116) is bonded to the grid. The strip in various embodiments is made of a metallic material and extends around a perimeter of the grid.

At 1310, a pan (e.g., pan 130) is disposed beneath the grid. The pan defines a cavity, and is configured to collect and/or direct the flow of liquid passing through the grid.

At 1312, a wicking layer (e.g., wicking layer 140) is provided. The wicking layer is configured to be interposed between the pan and the grid, and is configured to wick liquid that passes through the openings of the grid toward the pan. In some embodiments, the wicking layer includes plural sub-layers. For example, in the illustrated example, at 1314 plural sub-layers are provided, and at 1316, each sub-layer is bonded at discrete points to at least one of an adjacent sub-layer or the grid.

At 1318 of the illustrated example, a support layer (e.g., support layer 150) is provided. The support layer is interposed between the wicking layer and the pan. For example, the support layer may be bonded to the bottom of the wicking layer. In various embodiments, the support layer includes support openings that are smaller than the openings of the grid.

In the illustrated embodiment, with the various portions bonded to the grid directly or indirectly (e.g., forming a subassembly of the strip, grid, wicking layer, and support layer), the grid may be joined to the pan (e.g., via the strip). At 1320, the strip (which is made of a metallic material) is secured to a ledge of the pan via magnets. For example, magnets may be distributed about the ledge of the pan and aligned with the strip. Alternatively, the ledge may be made of a metallic material and the strip may have magnets attached thereto. Further alternatively, both the strip and the ledge may have magnets.

At 1322 of the illustrated embodiment, a reservoir (e.g., reservoir 170, reservoir 1170) is provided in fluid communication with the pan. The pan has a sloped floor configured to direct fluid to the reservoir. It may be noted that in some embodiments a reservoir may not be provided, and liquid allowed to accumulate in the pan. Further additionally or alternatively, an absorbent pad (e.g., absorbent pad 180, absorbent pad 1200) may be provided in a cavity of the pan, or in a separate reservoir.

At 1324 of the illustrated embodiment, at least one surround member (e.g., 160*a*, 160*b*, 160*c*, 160*d* of FIG. 9) is secured to the strip. For example, the pan may be disposed in the floor of a lavatory, and the surround members placed on top of the strip, with the surround members secured to the strip (e.g., via the magnets of the ledge and/or additional magnets disposed on the surround member).

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A dry floor assembly that is configured to form or be positioned on a floor of an enclosed space, the dry floor assembly comprising:

a grid having an array of openings configured to allow passage of liquid, the grid having members extending from a base to an upper surface, the upper surface configured to be walked upon, the members having a cross-section that tapers from the base to the upper surface, wherein the members are spaced apart at the base to define the openings;

a pan disposed beneath the base of the grid, the pan defining a cavity;

a wicking layer interposed between the pan and the grid, the wicking layer configured to wick liquid that passes through the openings of the grid toward the pan; and a support layer interposed between the wicking layer and the pan, the support layer comprising support openings that are smaller than the openings of the array of the grid.

2. The dry floor assembly of claim 1, wherein the grid is formed of a non-flammable material having a hydrophobic coating.

3. The dry floor assembly of claim 1, wherein the cross-section of the members of the grid defines an isosceles triangle tapering to a point at the upper surface.

4. The dry floor assembly of claim 1, wherein the wicking layer comprises plural sub-layers, each sub-layer bonded at discrete points to at least one of an adjacent sub-layer or the grid.

5. The dry floor assembly of claim 1, further comprising a strip extending around a perimeter of the grid and bonded to the grid.

6. The dry floor assembly of claim 5, wherein the pan comprises a ledge, the strip made of a metallic material, the strip secured to the ledge via magnets.

7. The dry floor assembly of claim 6, further comprising at least one surround member secured to the strip.

8. The dry floor assembly of claim 1, further comprising a reservoir in fluid communication with the pan, the pan having a sloped floor configured to direct fluid to the reservoir.

9. The dry floor assembly of claim 8, wherein the reservoir is articulable between a collection position and a liquid removal position.

10. The dry floor assembly of claim 1, further comprising an absorbent pad disposed beneath the wicking layer and configured to absorb liquid passing through the grid.

11. A method for providing a dry floor assembly that is configured to form or be positioned on a floor of an enclosed space, the method comprising:
providing a grid having an array of openings configured to allow passage of liquid, the grid having members extending from a base to an upper surface, the upper surface configured to be walked upon, the members having a cross-section that tapers from the base to the upper surface, wherein the members are spaced apart at the base to define the openings;
disposing a pan beneath the base of the grid, the pan defining a cavity;
providing a wicking layer interposed between the pan and the grid, the wicking layer configured to wick liquid that passes through the openings of the grid toward the pan; and
providing a support layer interposed between the wicking layer and the pan, the support layer comprising support openings that are smaller than the openings of the array of the grid.

12. The method of claim 11, wherein providing the grid comprises casting the grid using a non-flammable material, and coating the grid with a hydrophobic coating.

13. The method of claim 11, wherein providing the wicking layer comprises providing plural sub-layers, and bonding each sub-layer at discrete points to at least one of an adjacent sub-layer or the grid.

14. The method of claim 11, further comprising bonding a strip made of a metallic material extending around a perimeter of the grid to the grid, and securing the strip to a ledge of the pan via magnets.

15. The method of claim 14, further comprising securing at least one surround member to the strip.

16. The method of claim 11, further comprising providing a reservoir in fluid communication with the pan, the pan having a sloped floor configured to direct fluid to the reservoir.

17. The method of claim 11, wherein the enclosed space is a lavatory of a vehicle.

18. The dry floor assembly of claim 1, wherein at least some of the members defining the openings intersect with others of the members defining the openings.

19. The dry floor assembly of claim 18, wherein the at least some of the members are tapered at points of intersection with the others of the members.

20. A dry floor assembly that is configured to form or be positioned on a floor of an enclosed space, the dry floor assembly comprising:
a grid having an array of openings configured to allow passage of liquid, the grid having members extending from a base to an upper surface, the upper surface configured to be walked upon, the members having a cross-section that tapers from the base to the upper surface, wherein the members are spaced apart at the base to define the openings;
a strip extending around a perimeter of the grid and bonded to the grid;
a pan disposed beneath the base of the grid, the pan defining a cavity, wherein the pan comprises a ledge, the strip made of a metallic material, the strip secured to the ledge via magnets; and
a wicking layer interposed between the pan and the grid, the wicking layer configured to wick liquid that passes through the openings of the grid toward the pan.

21. The dry floor assembly of claim 20, wherein the grid is formed of a non-flammable material having a hydrophobic coating.

* * * * *